United States Patent Office 3,031,431
Patented Apr. 24, 1962

3,031,431
ADHESIVE COMPOSITION COMPRISING A RUBBER LATEX, A PHENOL, AN ALDEHYDE AND A DITHIOCARBAMATE, AND METHOD OF PREPARING SAME
Grover W. Rye, Akron, Ohio, assignor to The Goodyear Tire & Rubber Company, Akron, Ohio, a corporation of Ohio
No Drawing. Filed Dec. 6, 1956, Ser. No. 626,599
9 Claims. (Cl. 260—43)

This invention relates to the adhesive bonding of reinforcing elements to rubber and more particularly to the adjustment of the rate of bond formation to approach the rate of cure of the rubber being reinforced.

In the manufacture of rubber articles, including pneumatic tires and mechanical rubber goods, the life of these articles depends to a great extent upon the reinforcement employed and the ability to properly join the reinforcing material to the rubber. The reinforcing material is usually a fabric made of cords which in turn may be made of a natural textile material, such as cotton, or a cellulosic material, such as rayon, or a synthetic material, such as a polyamide reaction product, commonly referred to as nylon, or a linear polyester product, commonly referred to as Dacron.

These reinforcing materials are treated with an adhesive for the purpose of securing a strong and lasting bond between the material and the rubber in which it is embedded. A preferred adhesive useful in developing this bond comprises a resinous material, such as a heat-hardenable-phenol-aldehyde reaction product and a synthetic rubber latex, including the rubbery copolymers of styrene and butadiene-1,3, also known as GRS, which synthetic rubber latex may be used either in combination with or in place of natural rubber latex.

The reinforcing material is treated with the resin/rubber latex adhesive in any one of many different ways to insure intimate contact between the adhesive and the fibers of the cord making up the fabric reinforcement material, which treated fabric is then embedded in rubber and built, for example into a pneumatic tire, placed in a mold under pressure and subjected to heat sufficient to vulcanize the rubber and chemically convert the adhesive into a bond which locks the reinforcing material to the cured rubber.

It has been observed that the plies of, for example a pneumatic tire, tend to separate when the tire is removed from the mold sooner than a certain minimum time, which is required to develop a sufficient bond. To reduce this time period and still develop a sufficient bond, a distinct advantage would be in the greater production of vulcanized goods using the same amount of curing equipment.

A number of ways devised to achieve this reduction in curing time have been suggested but secondary undesirable results show up in, for example the loss of fatique life of the cord in the rubber and the loss of cord strength and elongation.

It has now been discovered that the bond-formation rate can be adjusted to effectively coincide with the vulcanization rate of the rubber being reinforced without undesirable side reactions or effects. This desirable result is obtained by adding a chemical agent having the general formula RR'NC(S)SM in which R and R' are aliphatic organic radicals having from 1 to 5 carbon atoms and M is a metal, particularly sodium. These chemicals may also be referred to as the metal alkyl dithiocarbamates.

A particularly effective chemical agent is sodium dimethyl dithiocarbamate. Other carbamates that may be used include the sodium salts of diethyl dithiocarbamic acid and of dibutyl dithiocarbamic acid.

It has further been observed that these compounds must be used in an amount sufficient to produce an adequate bonding of the fibrous material to the rubber within the time required to develop adequate cure in the rubber. Generally an amount of carbamate needed to develop adequate bonding is at least 2.5 parts per 100 parts of rubber by weight, depending upon the particular carbamate being used. It is preferred, however, to use at least 3 parts of the sodium dimethyl and sodium diethyl and sodium dibutyl dithiocarbamates.

In order to set forth more clearly the purpose of the invention, it will be described with reference to rayon cord but it is to be understood that any synthetic cord may be treated in accordance with the purpose of this invention, as well as cotton cords and fabric made from such cord.

The bonding agents or adhesives that are used in the treatment of the reinforcing cords are those comprising an aqueous solution of a resin-forming material, specific well-known materials being the heat-hardenable phenol-aldehyde resins, especially those phenol-aldehyde condensation resins in which the aldehyde is formaldehyde and the phenol is phenol or resorcinol and are used as described in greater detail in U.S. Patent 2,128,229. The phenol-aldehyde resin is used in combination with a synthetic or natural rubber latex, the rubber to resin ratio in adhesive compound may range from 6:1 to 2:1 parts by weight. The cord-treating composition may also contain other materials such as protein, for example, casein, gelatin, wheat protein, dried blood; wetting agents, other synthetic resins, carbon black, artificial dispersion of rubber, all of which may be added for a variety of purposes.

In order to more clearly illustrate the advantages and the scope of this invention, the following example sets forth the ingredients used in producing the improved cord-to-rubber adhesive of this invention, all parts being by dry weight per 100 parts of rubber latex solids unless otherwise indicated:

| | Parts |
|---|---|
| GRS latex (40%), 75/25 butadient/styrene rubbery copolymer | 100 |
| Resorcinol | 10.93 |
| Formaldehyde (37%) | 5.23 |
| Sodium hydroxide (10%) | 1.35 |
| Sodium dimethyl dithiocarbamate (41%) | 3.52 |
| Water sufficient to make a 20% solids. | |

The adhesive was made by adding the resorcinol to the water and then the formaldehyde was added to the water, followed by the addition of the sodium hydroxide and then the rubber latex. It is preferred to use sodium hydroxide as the alkali to catalyze the reaction of the phenol with the aldehyde in bringing about the formation of the water-soluble and thermosettable resin. The sodium hydroxide is used in amount sufficient to produce a pH in the finished adhesive dip of between 9.0 to 9.5. The aldehyde is preferred to be used in a molar excess ranging from 1.01 to 2.0 mols per mol of phenol and preferably from 1.5 to 1.7 mols of formaldehyde to 1 mol of resorcinol. After this reaction mixture was aged for a period of from one hour to 24 hours, the sodium dimethyl dithiocarbamate was added. It is also preferred to age the adhesive at least 4 hours after the carbamate is added. The resulting 20% solids adhesive dip had a pH of 9.2 and was applied to rayon tire cord fabric by passing the cord into the adhesive dip under tension and at a rate which permitted the cord to become wetted out and then dried, all in a period of three minutes at temperatures of from 250° to 325° F.

The cord as now treated was then embedded in natural rubber compounded as follows, all parts being by weight:

| | Parts |
|---|---|
| Natural rubber | 100 |
| Zinc oxide | 3.00 |
| Carbon black | 29.80 |
| Stearic acid | 2.00 |
| Pine tar | 7.00 |
| Mercaptobenzothiazole | 1.25 |
| Sulfur | 3.00 |
| Diphenylguanidine | 0.15 |
| Phenyl beta naphthylamine | 1.00 |

Conventional "H" test block samples of the treated cord were made by embedding ¼" of a length of the cord in a rubber block ¼" wide and 1" long and ⅛" thick. Four samples were made and tested, one not containing carbamate, and the other containing sodium dimethyldithiocarbamate. The samples being vulcanized at 290° F. for five minutes in one case and ten minutes in the other case. The hot static pull required to break the cord loose from the cured rubber at a temperature of 250° F. was 2.2 pounds and 4.5 pounds for the cord not treated with the carbamate and 11.2 pounds and 20.4 pounds for the cord treated with the carbamate each when heated for five minutes and ten minutes respectively.

It has also been observed that the use of the carbamates in the adhesives of this invention has a particularly desirable result in protecting the adhesive after it has been applied to and dried on the cord. The dried adhesive has a tendency to deteriorate when exposed to the air in that its ability to develop an adequate cord-to-rubber bond is substantially reduced as shown by the control in the table below. When a carbamate is added its protective imparting properties are shown in the table by the adequate bonds developed all when used on rayon cord and embedded in rubber as described hereinbefore, except that in each example in the table below the cord was cured in the rubber for 20 minutes at 290° F.

TABLE

*Hot Static Adhesion in Lbs. Pull*

| Example | Exposure Time | Control | Adhesive Containing | | | |
|---|---|---|---|---|---|---|
| | | | Sodium Dimethyl Dithiocarbamate | | Zinc Dibutyl Dithiocarbamate | |
| | | | 3 parts | 6 parts | 3 parts | 6 parts |
| 1 | Immediate (Control) | 17.1 | 21.0 | 22.0 | 22.3 | 23.7 |
| 2 | 7 days | 12.2 | 15.4 | 19.3 | 18.0 | 12.5 |
| 3 | 14 days | 12.6 | 12.9 | 19.4 | 17.5 | 13.8 |
| 4 | 35 days | 4.0 | 10.5 | 19.5 | 20.0 | 10.6 |

Swell volume measurements in benzene were also made on the dried solids from the above-identified adhesives in which the adhesive containing sodium dimethyldithiocarbamate was found to be twice that of the sample not containing the sodium dimethyldithiocarbamate. Swell volume is used as a measure of the unsaturation present in the polymers used in the adhesive. Thus, it is seen from this test that the presence of the carbamate chemically affects the adhesive. It is theorized that a possible explanation for the accelerated bond formation between the cord and the rubber being vulcanized in the presence of the dithiocarbamate radical is that the bond accelerating agent probably inhibits the curing of the rubber component of the adhesive layer which is believed to normally take place through the reaction of the resorcinol/formaldehyde resin with the rubber component of the adhesive. As a result of the interference of this chemical reaction between the resorcinol/formaldehyde resin and the rubber of the adhesive, the cord-to-rubber cure system shows up in the rubber assembly of the tire with more active sites available on the cord for chemical reaction with the rubber stock which is adjacent to the adhesive layer carried by the reinforcing cord. Normally one would be led to believe that the presence of substantial amounts of an accelerator type of compound, such as sodium dimethyldithiocarbamate would further accelerate the cure of the rubber adjacent the adhesive layer carried by the cord and thus overcure the rubber in this vicinity, causing loss in tensile strength and fatigue life in the resulting tire. However, it has been discovered that these carbamates do not function in this expected manner but rather function in the unexpected manner of producing the desired accelerated bonding between the cord and the rubber. This unexpected result is produced only when more than what is considered accelerator amounts of the carbamate are used and preferably when about 2.5 to about 10 parts, depending upon the carbamate, are used per 100 parts of rubber solids used in the adhesive.

It is to be observed that in each of the foregoing adhesives used in the present invention a vulcanization agent for the rubber component of the adhesive is not present nor need be used, even though a vulcanization accelerator type of chemical is used in greater than what is commonly used in combination with, for example, a sulfur compounded rubber.

Although the invention has been specifically described with reference to natural rubber as the material being reinforced, any compounded natural rubber stock or any compounded synthetic rubber stock, such as the copolymers of butadiene-1,3 with styrene, particularly the rubbery polymer resulting from the polymerization of a mixture comprising 75 parts of butadiene and 25 parts of styrene may be used. In its preferred form the invention contemplates any commercially compounded rubber stock employed in the manufacture of pneumatic tires, hose, conveyor belts and other industrial reinforced-rubber products. The rubbery material may also include any of the well-known compounding ingredients for rubber, such as vulcanizing agents and accelerators, antioxidants, fillers, reinforcing agents, emulsifiers, stabilizers, modifiers, and coloring agents, etc., in amounts and proportions in accordance with conventional compounding technique.

While certain representative embodiments and details have been shown for the purpose of illustrating the invention, it will be apparent to those skilled in this art that various changes and modifications may be made therein without departing from the spirit or scope of the invention.

What is claimed is:

1. A cord-to-rubber adhesive composition resulting from the reaction of a mixture consisting essentially of a vulcanizable synthetic rubber latex, a phenol, an aldehyde and a dithiocarbamate having the general formula RR'NC(S)SM in which R and R' are alkyl radicals having 1 to 5 carbons and M is a metal, the dithiocarbamate being present in an amount of from 2.5 parts to 10 parts per 100 parts by weight of vulcanizable rubber, the synthetic rubber latex being present in an amount of from 6 to 2 parts per part of combined phenol and aldehyde.

2. The composition of claim 1 in which the carbamate is sodium dimethyldithiocarbamate.

3. The composition of claim 2 in which the phenol is resorcinol and the aldehyde is formaldehyde.

4. The composition of claim 3 in which the vulcanizable synthetic rubber latex is the rubbery copolymer of butadiene and styrene.

5. The composition of claim 4 in which the formaldehyde is present in an amount of from 1.01 to 2.0 mols per mol of resorcinol.

6. The composition of claim 5 in which sodium hydroxide is used in amount sufficient to adjust the pH of the composition to a value between 9.0 and 9.5.

7. The composition according to claim 6 in which the carbamate is present in an amount of 3 parts per 100 parts of rubber.

8. The method of making a cord-to-rubber adhesive composition which comprises reacting a phenol and an aldehyde in the presence of an alkali catalyst and water to form a reaction product, adding a synthetic rubber latex to the reaction product, and then adding a dithiocarbamate, having the general formula RR'NC(S)SM in which R and R' are alkyl radicals having 1 to 5 carbons and M is a metal, to the reaction product, the dithiocarbamate being present in an amount of from 2.5 parts to 10 parts per 100 parts by weight of vulcanizable rubber in the adhesive composition.

9. The method of making a cord-to-rubber adhesive composition which comprises reacting a phenol and a molar excess of an aldehyde in the presence of an alkali catalyst and water to form a reaction product, adding a synthetic rubber latex to the reaction product, aging the reaction product from 1 to 24 hours, adding a dithiocarbamate having the general formula RR'NC(S)SM in which R and R' are alkyl radicals having 1 to 5 carbons and M is a metal, to the reaction product, the dithiocarbamate being present in an amount of from 2.5 parts to 10 parts per 100 parts by weight of vulcanizable rubber in the adhesive composition.

References Cited in the file of this patent

UNITED STATES PATENTS

| | | |
|---|---|---|
| 2,128,635 | Charch et al. | Aug. 30, 1938 |
| 2,331,323 | Jahant | Oct. 12, 1943 |
| 2,354,426 | Briant | July 25, 1944 |
| 2,540,592 | Newberg et al. | Feb. 6, 1951 |
| 2,615,059 | Bemmels | Oct. 21, 1952 |
| 2,652,353 | Wilson | Sept. 15, 1953 |
| 2,816,286 | Harvey et al. | Dec. 10, 1957 |
| 2,837,458 | Coleman | June 3, 1958 |

FOREIGN PATENTS

| | | |
|---|---|---|
| 595,290 | Great Britain | Dec. 1, 1947 |

OTHER REFERENCES

Le Bras et al.: Ind. Eng. Chem., volume 43, No. 2, February 1951, pages 381–386.